No. 883,368. PATENTED MAR. 31, 1908.
J. A. WIGGS, JR.
ROTARY BORING MECHANISM.
APPLICATION FILED JULY 24, 1906.

Witnesses
Thos. W. Riley.
James C. Babcock.

Inventor
James A. Wiggs Jr.
By W. H. Babcock
Attorney

No. 883,368.  
PATENTED MAR. 31, 1908.  
J. A. WIGGS, Jr.  
ROTARY BORING MECHANISM.  
APPLICATION FILED JULY 24, 1906.

Witnesses  
Thos. W. Riley.  
James C. Babcock.

Inventor  
James A. Wiggs Jr.  
by  
W. H. Babcock  
Attorney

No. 883,368. PATENTED MAR. 31, 1908.
J. A. WIGGS, Jr.
ROTARY BORING MECHANISM.
APPLICATION FILED JULY 24, 1906.

Witnesses
Thos. W. Riley
James E. Babcock

Inventor
James A. Wiggs Jr.
By W. H. Babcock
Attorney

No. 883,368. PATENTED MAR. 31, 1908.
J. A. WIGGS, Jr.
ROTARY BORING MECHANISM.
APPLICATION FILED JULY 24, 1906.

Witnesses
Thos. W. Titus
James E. Babcock

Inventor
James A. Wiggs Jr.
By W. H. Babcock
Attorney

No. 883,368. PATENTED MAR. 31, 1908.
J. A. WIGGS, Jr.
ROTARY BORING MECHANISM.
APPLICATION FILED JULY 24, 1906.
8 SHEETS—SHEET 8.

Witnesses
Thos. W. Riley.
James C. Babcock.

Inventor
James A. Wiggs Jr.
By W. H. Babcock
Attorney

UNITED STATES PATENT OFFICE.

JAMES A. WIGGS, JR., OF BEAUMONT, TEXAS.

ROTARY BORING MECHANISM.

No. 883,368.          Specification of Letters Patent.        Patented March 31, 1908.

Application filed July 24, 1906. Serial No. 327,483.

*To all whom it may concern:*

Be it known that I, JAMES A. WIGGS, Jr., citizen of the United States, residing at Beaumont, in the county of Jefferson and State of Texas, have invented certain new and useful Improvements in Rotary Boring Mechanism; and I do hereby declare the following to be a full, clear, and exact description of the invention, such as will enable others skilled in the art to which it appertains to make and use the same.

This invention relates to rotary drilling mechanism for boring wells and similar purposes and more especially to that kind or class of such mechanism wherein a rotary table or ring is employed, carrying gripping devices and provided with means for closing the same on a tube, stem or rod, whereby the latter is compelled to turn with said gripping devices and table, though permitting endwise motion as fed downward through the same in boring. In such mechanism, the table has usually been provided with a circular gear or series of cog-teeth engaged by a rotary driving pinion.

The chief objects of the present invention are to permit the removal of the said pinion at need, without disturbing the rotary table or other parts of the machine; to provide for the automatic discharge of mud, sand and other fine foreign matter from the raceway; to supply improved means for closing and opening the gripping devices; to afford a space below the driving pinion for facilitating the removal of the same; to furnish suitable means for holding and guiding the rotary table; to provide improved means for securely holding in position the gripping cones and the parts which operate and support them, while allowing a slight vertical play of the said gripping and actuating devices and permitting their detachment at will; to properly guide and brace the said gripping devices while permitting such vertical movement; to facilitate the removal of the gripping devices and their actuating shafts from their supports while locking the grip-roller shafts and the nuts of the screw-threaded shafts against rotation; and generally to improve the various details of the machine and its efficiency as a whole.

To these ends the said invention consists in the construction and combination of parts hereinafter more particularly set forth and claimed.

In the accompanying drawings, Fig. 4$^a$ represents a detail vertical central section from front to rear of one of the clamping frames or table holding devices. Fig. 4$^b$ represents a front elevation of the same. Fig. 5 represents a transverse vertical section on the line 5—5 of Fig. 1; Fig. 5$^a$ represents a detail bottom view of one of the pocket, bolt-heads and proximate parts for detachably holding the shaft bearings.

A designates the bed-frame of the machine, the base plate 1, somewhat more than half as long as said frame, being fastened thereto by long bolts $a$. Bearing caps B B', the former being the outer bearing cap, and the latter, the inner one, are fastened respectively on the bed frame A at the end away from the rotary table and on the corresponding end of the base plate. Under the inner bearing cap B' is a block 19, rigid with the said base plate. These bearing caps hold the rotary driving shaft 24 with interposed anti-friction bushings b and are also provided on top with oil cups d held in place by bolts c and lubricating the said shaft through ducts e. The said shaft receives motion from any suitable source of power through a sprocket wheel 23 or its equivalent, which is sleeved on said shaft and clutched at will by a clutch collar 21 splined thereon. A lever 22, pivoted at its bifurcated lower end to lugs D' raised from a metal strap D bolted to the bed frame, operates said clutch collar in the usual way. A spacing sleeve 20 is interposed between said clutch collar and said block 19.

Figure 2:
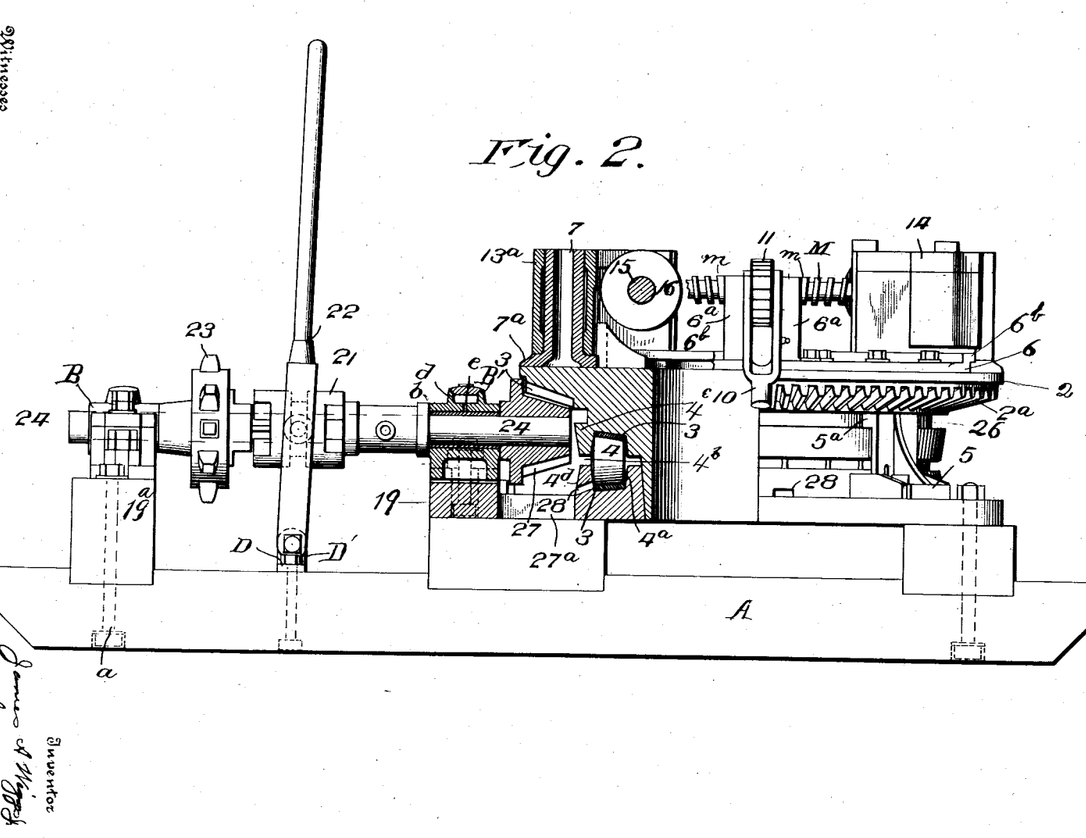
Fig. 2 represents a longitudinal section of the same on the line 2—2 of Fig. 1, partly in side elevation slightly broken away.
Figure 3:
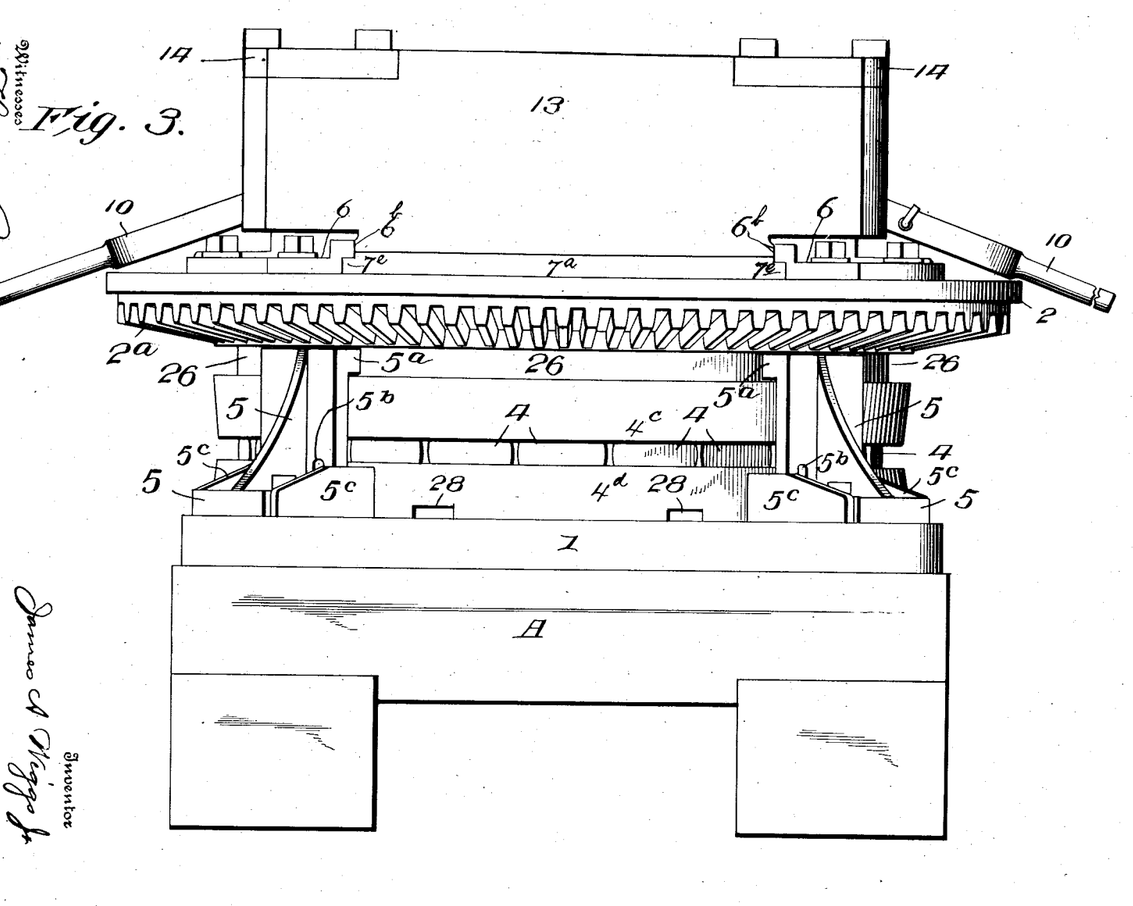
Fig. 3 represents an end elevation of the same, taken from the right hand of Figs. 1 and 2.
Figure 4:
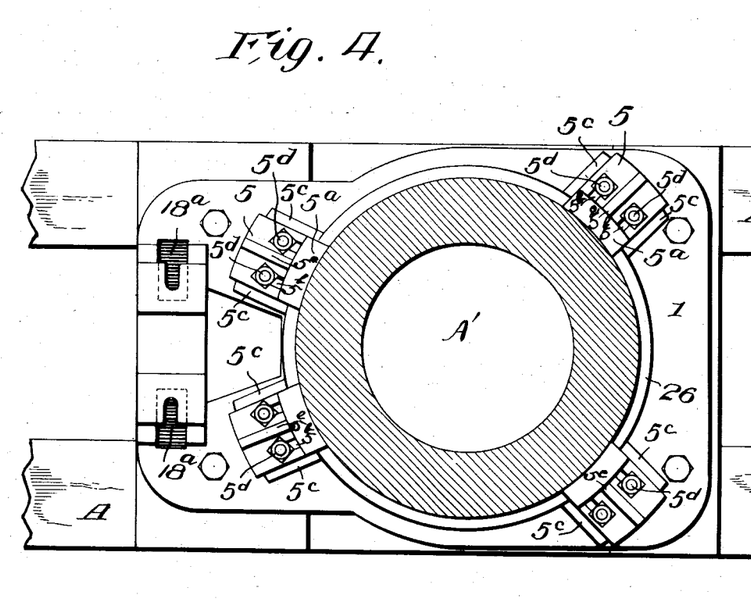
Fig. 4 represents a horizontal section taken through the table on a line just below the cog teeth 2$^a$, giving a plan view of the lower devices.
Figure 4A:
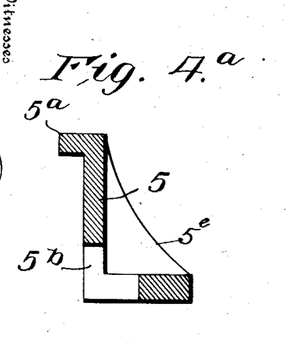
Figure 4B:
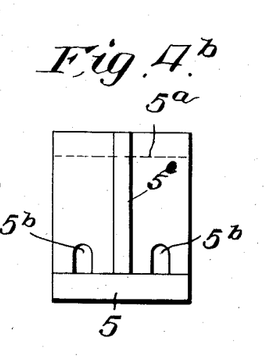
Figures 5, 5A:
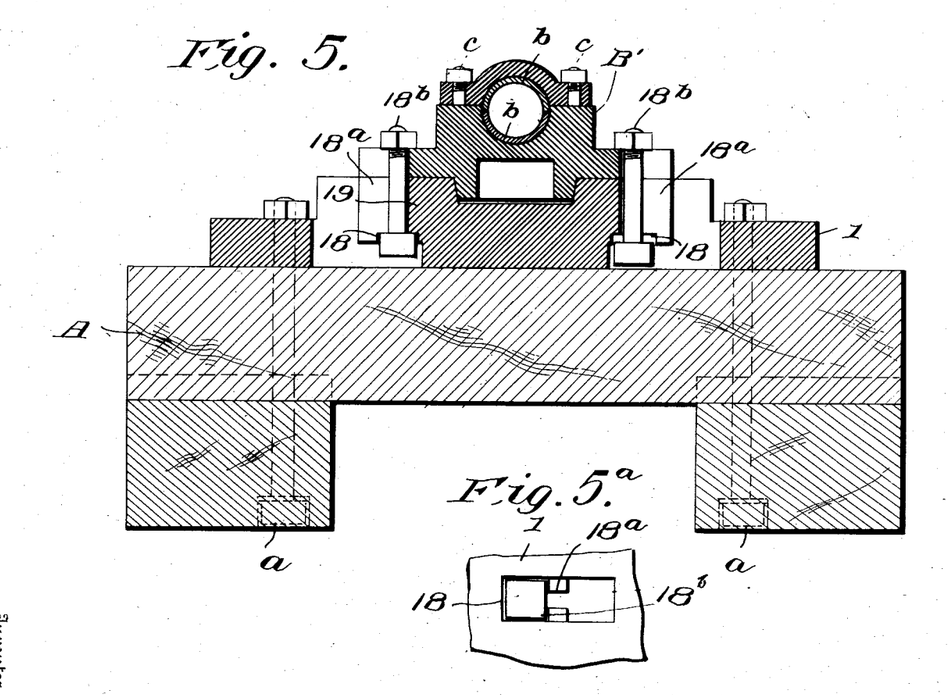

The driving pinion 27 is mounted on the inner end of said driving shaft and turns therewith. Being subject to continual wear while in use, it must from time to time be removed for repair, cleaning or replacement. Of course there is great advantage in effecting such removal without disturbing the remainder of the machine. For this purpose I provide the block 19 with lateral slots 18$^a$, extending outward from bolts 18$^b$, which fasten the bearing cap B' in place. These slots are wide enough at all points of their lower parts to let the heads of the said bolts pass outward beyond the said blocks, thus freeing the bearing cap B'; but the outer portion of the upper part of each of said slots is too narrow to permit such outward passage of the head, but forms an inner and upper pocket 18, the metal inclosing which is in one piece with the base-plate 1. The said pocket is square, fitting the head of the bolt and preventing the loosening of the nut as well as wear resulting from its turning. Since the two bolts 18$^b$ are thus held immovable while tightened, the bearing cap B' is securely held also. For removal, it is necessary only to loosen the nuts of the bolts, thereby letting their heads down below the pockets 18, then slip them out laterally and lift off the bearing cap B'. The screws or bolts O which pass through slots P of bearing cap B to fasten the same are then removed, allowing said cap to be taken off, when the said driving shaft may easily be lifted off, partly or wholly, and the driving pinion removed or replaced without disturbing any other element of the mechanism. To facilitate the removal of the said driving pinion a deep recess 27$^a$ is formed in plate 1 directly under it. This will allow the said pinion to tilt in removal and make it more accessible. These improvements effectually obviate the need of dismantling the machine to repair said pinion, a procedure hitherto generally found necessary. The said pinion meshes, as is usual in such machines, with a gear wheel or series of cog teeth 2$^a$ on the under side of a rotary table 2, turning on anti-friction outwardly-flaring conoidal rollers 4, in a race-way 4$^a$. To prevent the wear of the said table and of the race-way bottom which is integral with base plate 1, I insert two lining rings 3 of hard metal, covering each of these surfaces above and below said rollers. These rings fit the said rollers and consequently the upper faces of said rings incline downwardly and outwardly, as do those of the corresponding faces of parts 1 and 2 lined by them. Normally a plainly visible interval 4$^b$ is left, as shown in Fig. 2, at the outer edge of the raceway between annular walls 4$^c$ and 4$^d$ of said parts 1 and 2, which walls constitute the front of the raceway and prevent said rollers from slipping out. The disappearance, or approximate disappearance, of this interval announces the wearing out of the said lining rings, which should then be renewed.

The accumulation of sand, mud and other comminuted matter in the raceway has been found a serious evil, requiring frequent interruption of work to cleanse the parts affected and causing more or less injury and excessive wear. Some means of relief which will not require such interruption but will be continuously effective without trouble, is greatly needed. To this end, I provide the raceway with a downwardly inclined outlet passage or passages 28, extending from the outer edge of the downwardly inclined bottom of the raceway through the outer wall 4$^d$ thereof to the exterior. Any foreign matter in said raceway will be worked out through such outlet by the combined action of the rollers, the rotating table and gravity. Preferably there are a number of these passages 28.

Figure 9:
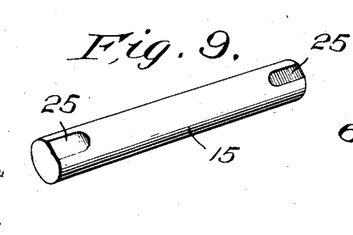
Fig. 9 represents a detail perspective view of one of the shafts 15.
Figure 10:
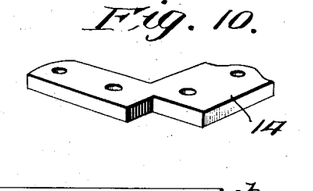
Fig. 10 represents a similar view of one of the bearing plates 14, for locking the same and also locking the square adjusting nut hereinafter described.
Figure 11:
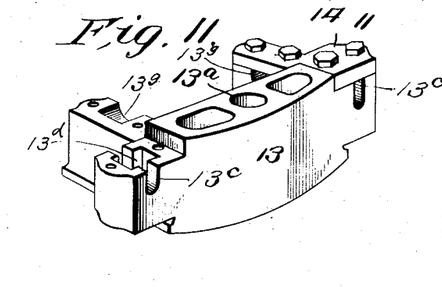
Fig. 11 represents, on a smaller scale than most of the other detail figures, a perspective view of one of the bearing frames 13 hereinafter described, showing only one of the bearing caps 14 in place.
Figure 12:
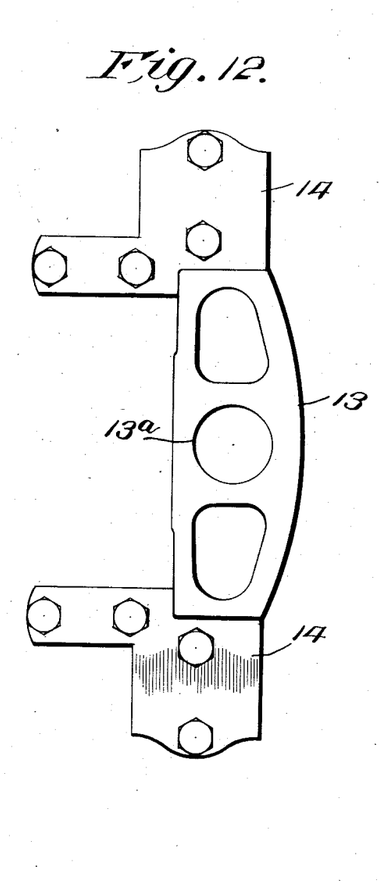
Fig. 12 represents a detail plan view of the same on a larger scale.
Figure 13:
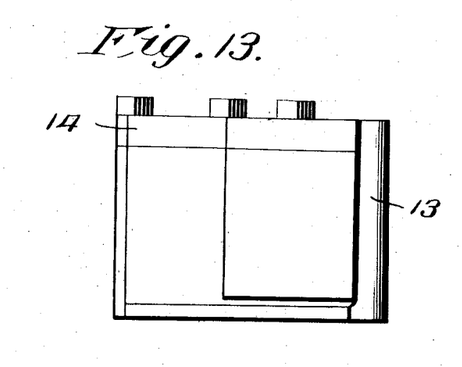
Fig. 13 represents a detail end elevation of the same.
Figure 14:
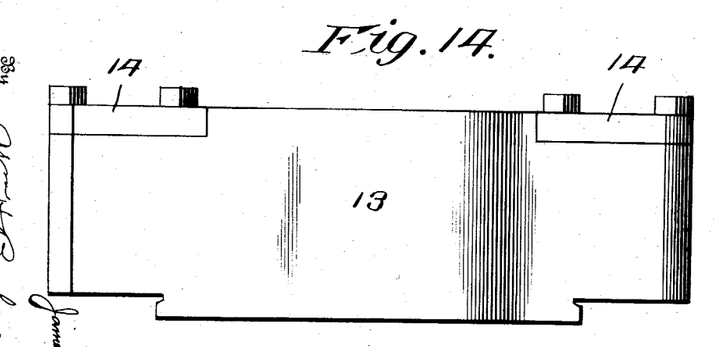
Fig. 14 represents a detail side elevation of the same from the outer side.

The table 2 has the ordinary annular form surrounding a central opening A', intended to receive as usual a vertical boring rod or well tube (not shown) turning with said table. Said tube or rod is held between two pairs of gripping rollers 16, which are loose on their horizontal shafts 15, the latter being held against turning, as hereinafter described. These rollers may have washers 17 on the shaft behind them and their construction and form may be varied in accordance with convenience. No novelty is claimed in them alone. They are substantially shown in the patent of M. T. Chapman #382,689 and in divers later well known patents granted to him and to others. Each shaft 15 is provided on the top of each end with a flattened face 25, on which a cap 14 fits to lock it against rotation in the open top bearings 13$^g$ of its grip-frame 13. The shaft 15 is set in the bearings 13$^g$, with the flattened faces 9 uppermost, as they are in Fig. 9 and the flat caps 14, Figs. 10 and 11 are bolted down, as shown at the upper or right end of Fig. 11, it is evident that the shaft cannot turn in said bearing. The shaft 15 and one of the caps 14 are omitted from Fig. 11, in order that the construction of the bearings 13$^g$ and other parts may more clearly appear. By thus holding the said shaft from turning, and mounting the rollers 16 loosely thereon, as already stated, the said rollers do the turning and the wear of the shafts 15 in the bearings 13ᵍ is altogether obviated.

In drilling hard rock, there is a constant tendency of the drill tube to jump or vibrate vertically, the same varying with the differences in the material encountered; and the jars thus given are very injurious to the teeth of the driving pinion and of the table. To obviate this and for other purposes, the said gripping rolls and proximate parts have sometimes been made vertically movable with the drilling tube to a limited extent. For permitting this I employ special improved devices shortly hereinafter set forth.

The two grip frames 13 are arranged on each side of the drilling tube, not shown, each end of each grip-frame being provided horizontally and transversely with bearings 13ᶜ for one end of one of a pair of right and left screws or screw-threaded shafts M, also with a square recess 13ᵈ open on top and receiving a square nut 13ᵉ that engages said shaft. These two screws or shafts M, by their rotation one way or the other, tighten the said gripping-rolls on the said tube or free them therefrom, at will. The said screw-threaded shafts M have generally been rotated by a wrench or other tool fitting some prismatic part of the same; but I use instead a lever 10 straddling a ratchet wheel 11 on a smooth middle part $m$ of said shaft M and provided with a pawl 12 for engaging the same, said pawl being pivotally hung between the bifurcations of the lower end of the said lever and the said bifurcations having bearings on the said middle part $m$. These screw-threaded shafts and the nuts engaged thereby have long been the usual means, mechanism or devices for adjusting or moving the gripping rollers and their shafts toward or from the boring tube or rod. Grip-frames sometimes called jaws, or by other names, are the usual means for supporting the shafts that carry the grip rollers or other gripping devices; and in the present instance they may also be considered part of the means, mechanism or adjusting devices for moving the slide frames toward or from each other, since they carry the nuts which engage the said screw-threaded shafts; also, the said grip frames with the roller carrying shafts constitute the supporting devices or supports for the grip-rollers, which are the immediate gripping devices. The mechanism, including gearing for turning the rotary table $d$ is fully described in this specification, and the table of course carries around with it the slide frames, the grip frames, the four shafts and the nuts and gripping rollers.

Figure 6:
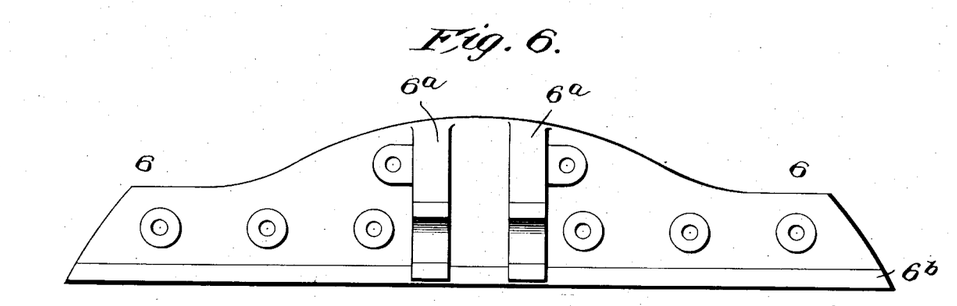
Fig. 6 represents a detail plan view of one of the fixed plates or frames 6.
Figure 7:
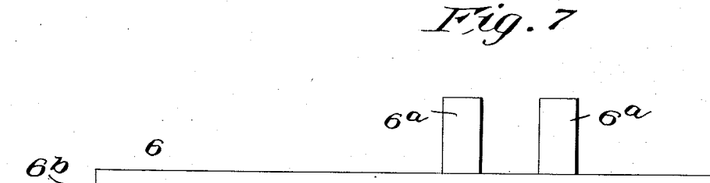
Fig. 7 represents a side elevation of the same, looking from the inner side.
Figure 8:
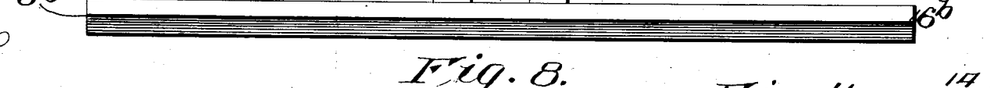
Fig. 8 represents an end elevation of the same.

Each grip frame 13 is provided in the middle with a vertical tubular socket 13ᵃ, which receives a cylindrical post 7, rigid and preferably integral with a plate or frame 7ᵃ sliding on the top of said table but held thereto as hereinafter described. Raised wings or stops 7ᶜ and 7ᵈ rigid, and preferably integral, with plate 7ᵃ, and located at the inner edge of the same, receive the grip frame 13 between them and prevent it from turning pivotally on post 7, so that it is held rigid by said sliding plate or frame 7ᵃ, presenting always the gripping rollers in proper position to hold the pipe and preventing their binding unevenly thereon. Two guide frames or plates 6 are bolted to the rotating table under the said screw-threaded shafts M. Each plate or frame 6 is provided with a pair of rigid and preferably integral raised lugs 6ᵃ, slotted from the top down to receive one of the said shafts. Each plate or frame 6 has its inner edge 6ᵇ (Figs. 6 and 7) undercut or grooved, so that it will overlap the proximate edge 7ᵈ of each sliding plate or frames 7ᵃ. In consequence, the two fixed frames or plates 6, constitute a guideway for the two sliding plates or frames 7ᵃ, holding them securely to the table, but permitting their free regular and even movement toward or from each other. The slotted lugs or bearings 6ᵃ of each guide plate or frame 6 receive the smooth middle part $m$ of the proximate shaft M, and are located on each side of its ratchet wheel and lever. These slotted bearings permit the shafts to rise and fall with the grip frame 13, the shafts 15 and the gripping rollers 16, but are sufficiently high to prevent any horizontal motion of the gripping mechanism as a whole in a direction longitudinal with respect to shafts 15 and lateral with respect to screw-threaded shafts M. Thus, with the restraining action of sliding frame 7ᵃ already described, the gripping frames are prevented from moving wholly or partly in any horizontal direction, except as drawn toward the drilling pipe or rod or moved back therefrom by said screw-threaded shafts M, the frames 7ᵃ sliding with the said grip frames 13 over the table top, but being held to the latter by guide ways 6ᵇ, formed by the inner edges of plates 6, Figs. 6 and 7.

In the periphery of the rotary table 2, I form an annular groove 26, which receives the inwardly presented curved rib or flange 5ᵃ of each one of four supporting and fastening legs or frames 5, arranged equidistantly around the said table and bolted through their bases to the base-plate 1. These legs or frames 5 securely clamp the said table to the said base-plate, while permitting free rotary motion of the former. They also brace the said table against radial or tangential strain, and may aid in its support. Each of these fastening frames 5 is provided with a pair of slots 5ᵇ extending upward and also horizontally outward. The parallel horizontal parts of said slots receive screws or bolts 5ᵈ extending upward from or through the base plate 1, and having nuts turned on their upper ends to adjust the position of said fastening frame. Between said slots a bracing rib 5ᵉ is formed on said frame. The said base plate is provided with a pair of raised walls or ribs 5ᶜ for each of these fastening frames, said frame being received between the said walls and laterally braced thereby.

Figure 1:
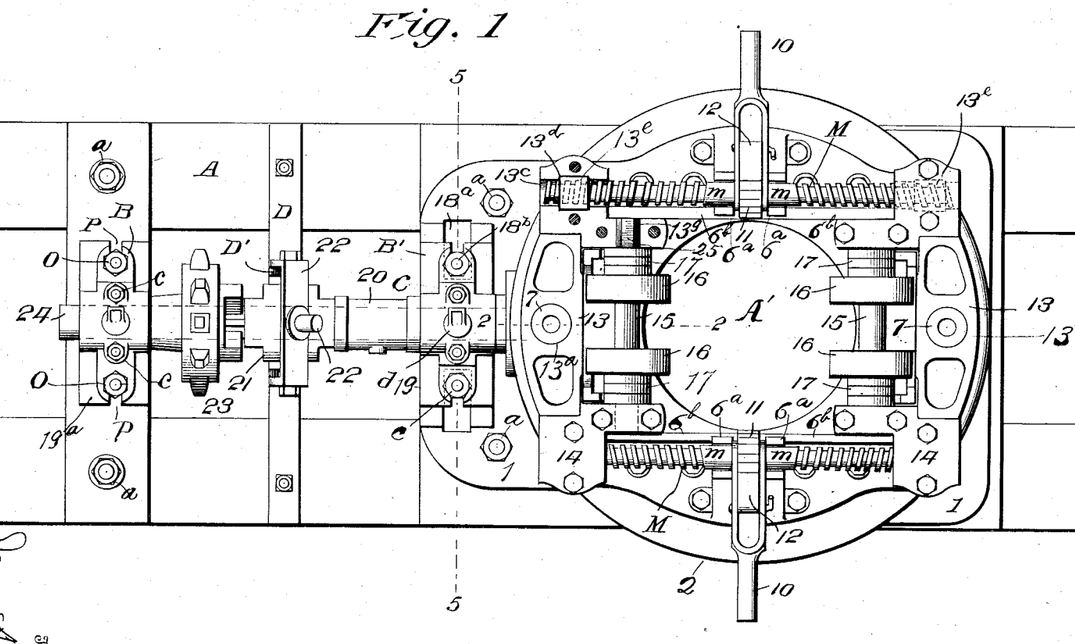
Figure 1 represents a plan view of a machine embodying my invention, partly broken away.
Figures 15, 16, 17, 18, 19:
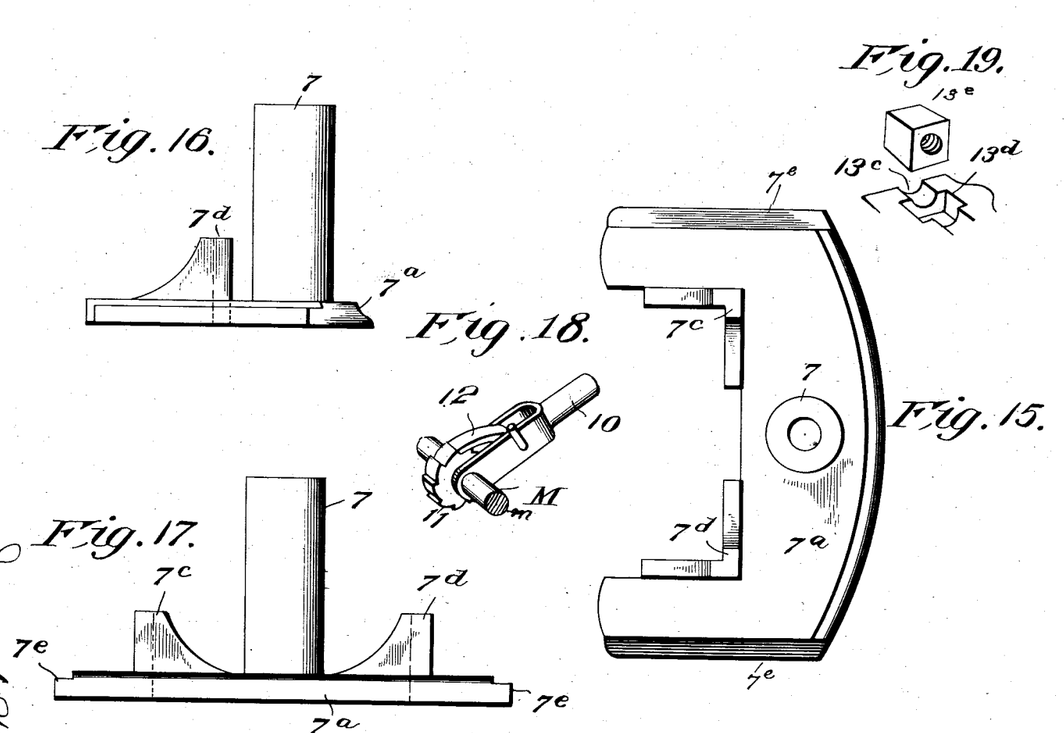
Fig. 15 represents a detail plan view of one of the sliding plates or frames 7$^a$.
Fig. 16 represents an end elevation of the same.
Fig. 17 represents a side elevation of the same from the outer side.
Fig. 18 represents a detail perspective view of the middle part of one of the shafts M and proximate devices.
Fig. 19 represents a detail view of one of the square nuts and proximate parts.

Each cap or cap-plate 14 is right-angular in form and covers the open tops of the bearings 13ᶜ and 13ᵍ for the proximate ends of shafts 15 and M, also the open top of square recess 13ᵈ, which receives square nut 13ᵉ as hereinbefore described. Consequently when the four caps or plates 14 are fastened down all the parts of the tube gripping mechanism are held in position for service and the shafts 15 and nuts 13ᵉ (see Fig. 1 also, in detail, Fig. 19) are prevented from turning; but when the said caps are removed the entire gripping mechanism may be lifted out or any of the shafts and appurtenances may be lifted out alone, without disturbing the remainder of the machine.

The construction hereinbefore described permits me to conveniently remove my drilling tube without disarranging the table, which action must always involve considerable risk of subsequent imperfect alinement and the boring of an irregular or not exactly straight hole. Of course this machine is equally adapted to use with a tube doing its own drilling or a drill-rod operating to prepare the way for the tube. It may also be used wherever any tube, rod, stem or other similar article, tool or structure is to be turned axially and fed lengthwise for any purpose whatever. But in well boring its chief utility will be found.

Having thus described my invention, what I claim as new and desire to secure by Letters Patent is:

1. In rotary boring mechanism, two pairs of tube-gripping rollers, which are free to turn on their shafts and arranged opposite to each other, in combination with said shafts, each of which is flattened at one end, grip-frames supporting said shafts, parts clamped against the flattened parts of said shafts to prevent them from turning, adjusting devices for moving said shafts toward or from each other and a rotary table or support for carrying them in rotation about a common axis substantially as set forth.

2. In rotary boring mechanism, two pairs of tube-gripping rollers which are free to turn on their shafts and arranged opposite to each other, in combination with said shafts which are flattened on top at one end of each, a table having an opening in its center, means for supporting said shafts from said table, plates adapted to be fastened in contact with said flattened parts to prevent such shafts from turning, adjusting devices for moving said shafts toward and from each other and mechanism for rotating said table for the purpose set forth.

3. In rotary boring mechanism, a rotary table, having a central opening for the tube or rod to be rotated, in combination with two grip frames arranged on opposite sides of the center of said table and free from engagement with any other device adapted to prevent independent automatic vertical upward movement of said grip-frames, tube-gripping devices carried by the said grip-frames, slide-frames carried by said table, supporting said grip-frames and provided with stops to prevent the said grip frames from turning pivotally, though permitting them to rise independently, adjusting devices for moving each grip-frame and its slide-frame together toward or from the center of the table at the will of the operator, and mechanism for rotating the said table and the above parts carried thereby for the purpose set forth.

4. In rotary boring mechanism, a rotary table having a central opening, in combination with a pair of grip-frames on opposite sides of said table, tube-gripping devices carried by said grip-frames, posts on which the said grip-frames are vertically movable, slide frames having said posts fixed thereon, adjusting devices for moving said grip-frames and slide frames toward or from the center of the table and means for rotating said table substantially as set forth.

5. In rotary boring mechanism, a rotary table having a central opening, in combination with a pair of grip frames, each having a vertical opening at its middle, tube gripping devices carried by said frames, a pair of slide frames on opposite sides of the center of said table, each of said slide frames having a post which passes up through such opening of one of said grip-frames, permitting the latter to rise independently thereon at need, screw-shafts for adjusting said grip-frames and slide frames toward each other and mechanism for rotating the said table substantially as set forth.

6. In rotary boring mechanism, a rotary table having a central opening, in combination with a pair of grip frames each having an opening at its middle, a pair of slide frames each having a post which extends up through such opening of one of the grip-frames, permitting the latter to rise independently, guides for said slide frames confining them to horizontal motion toward and from each other, mechanism for adjusting the said grip-frames and slide frames toward and from each other and means for rotating the said table substantially as set forth.

7. In rotary boring mechanism, a rotary table having a central opening, in combination with a pair of grip-frames each having an opening at its middle, tube gripping devices carried by said grip-frames, a pair of slide frames each having a post which extends up through such opening of one of the said grip-frames, permitting the latter to rise independently, mechanism for adjusting the said grip-frames and slide frames toward and from each other and mechanism for rotating the said table, each of the said slide-frames being further provided with raised walls which prevent the said grip-frames from turning on the said posts substantially as set forth.

8. In rotary boring mechanism, a pair of oppositely arranged slide-frames, each of which is provided with a raised post and raised side walls, in combination with means for adjusting the grip-frames and said slide-frames toward, and from each other, a pair of grip-frames carried by said slide frames, tube gripping devices carried by said grip-frames, a table supporting said slide-frames and grip frames and gearing for rotating said slide-frames, grip-frames and gripping devices collectively, each of the said grip frames being fitted upon one of the said posts and in contact with two of the said raised walls, whereby it is held against turning pivotally on said post, although free to rise independently substantially as set forth.

9. In rotary boring mechanism, two grip-frames arranged opposite each other and provided with tube-gripping devices, in combination with means for moving the said grip-frames toward or from each other, slide-frames provided with posts, which permit the said grip-frames to rise thereon independently, a table or support carrying said slide frames, means for rotating said table and the said parts carried thereby, and stops to prevent the said grip-frames from turning pivotally on the slide-frames which support them substantially as set forth.

10. In rotary boring mechanism, two sets of tube gripping devices, and shafts carrying the same, in combination with screw threaded shafts and screw-threaded devices engaging therewith for moving said gripping devices and their shafts toward or from each other at the will of the operator, vertically slotted bearings for said shafts, permitting the latter to rise and fall with said gripping devices, the said shafts being provided with smooth parts turning in said slots substantially as set forth.

11. In rotary boring mechanism, a pair of grip-frames, in combination with posts on which they are sleeved for independent vertical movement, parts supporting said posts and movable toward and from the center of the table gripping devices and their shafts carried by said grip-frames, screw-threaded shafts and nuts for adjusting the first named shafts toward or from each other, and vertically slotted bearings for said screw-threaded adjusting shafts, permitting them to rise in said bearings with said grip-frames substantially as set forth.

12. A grip-frame for supporting tube-gripping devices, in combination with a horizontally sliding frame having a post that extends up through said grip-frame and a pair of walls raised on said slide frame in proximity to the sides of said grip-frame to prevent the latter from turning on said post.

13. In rotary drilling mechanism, a pair of grip-frames and tube-gripping devices carried thereby, in combination with devices which engage said frames to prevent their turning, but permit their independent vertical motion, adjusting shafts and nuts engaging said frames for adjusting them toward or from each other at the will of the operator and parts supporting said adjusting shafts and preventing their lateral movement, while leaving such adjusting shafts free to rise with the said grip-frames substantially as set forth.

14. In rotary boring mechanism, a pair of grip-frames and tube-gripping devices carried thereby, in combination with devices which support said frames, but permit them to rise independently, screw-threaded shafts for adjusting said frames toward or from each other at the will of the operator, removable nuts receiving the ends of said screw-shafts and held by said grip-frames, removable caps fastened over said nuts, and vertically slotted parts supporting said shafts substantially as set forth.

15. In rotary boring mechanism, a pair of vertically movable grip-frames, which are also movable toward or from each other, in combination with gripping devices carried thereby, slide frames provided with raised walls in proximity to the said grip frames, preventing them from turning pivotally, and with posts which pass centrally up through the said grip frames, permitting them to rise but preventing their endwise horizontal movement, rotary screw-threaded shafts, engaging appurtenances of said grip frames to draw the latter together or move them apart at the will of the operator, and relatively fixed vertically slotted parts which afford bearings for said screw-threaded shafts and permit them to rise therein with the said grip-frames, but prevent the horizontal inward or outward movement of said screw-threaded shafts substantially as set forth.

16. A pair of grip-frames provided with tube-gripping devices, in combination with slide-frames on which they are mounted and adjusting devices for moving the said grip-frames and slide-frames toward or from each other, each slide-frame being provided with raised parts which prevent the grip-frame that it carries from moving independently except in a vertically upward direction, said raised parts including walls which fit against said grip-frame substantially as set forth.

17. In rotary boring mechanism, a pair of grip-frames arranged opposite each other and provided with tube-gripping devices, in combination with a pair of right and left screw-threaded shafts and screw-threaded parts for drawing said grip-frames toward each other or moving them apart at the will of the operator, ratchet wheels fast on the said shafts, levers mounted on the said shafts, pawls carried by said levers for engaging said ratchet wheels, and relatively fixed frames having raised slotted lugs which afford bearings for said shafts and prevent their lateral movement, both said grip frames and said shafts being free to rise vertically, substantially as and for the purpose set forth.

18. In rotary boring mechanism, a table having a central opening and means for rotating said table, in combination with a pair of slide-frames on opposite sides of the center of said table, a pair of grip frames mounted on said slide-frames and movable with them toward or from said center, tube-gripping devices carried by said grip-frames, a pair of rotary right and left screw-threaded shafts, screw-threaded parts engaging said shafts and carried by said grip-frames, means for rotating said shafts and guide frames fixed on said table and overlapping the edges of said slide-frames, said guide-frames being also provided with raised bearings and said slide frames permitting the independent vertical movement of the parts supported thereby, but being provided with stops for preventing their lateral movement substantially as set forth.

19. Prismatic nuts and adjusting screw-threaded shafts engaging the same in combination with grip-frames having prismatic recesses receiving said nuts, removable caps closing said recesses to lock said nuts against turning, grip roller shafts mounted in said grip-frames and tube-gripping rollers carried by the latter shafts in order that they may be drawn toward or moved away from each other by said adjusting shafts and nuts substantially as set forth.

In testimony whereof, I have signed my name to this specification in the presence of two subscribing witnesses.

JAMES A. WIGGS, Jr.

Witnesses:
F. A. SEEGER,
B. G. NEVILLE.